Figure 1:
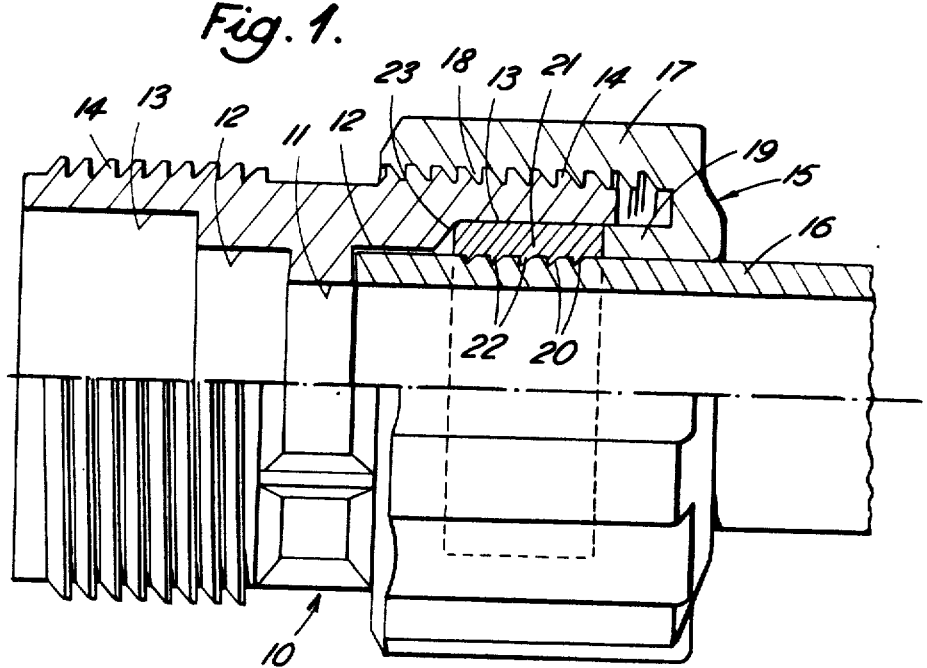

United States Patent
Boast

[15] 3,668,754
[45] June 13, 1972

[54] METHODS OF FORMING PIPE JOINTS

[72] Inventor: Derek Walter Boast, Penhurst, Hill Crescent, Totteridge, London, No. 20, England

[22] Filed: April 22, 1970

[21] Appl. No.: 30,834

[52] U.S. Cl. .................. 29/157, 29/447, 285/342, 285/354, 285/381
[51] Int. Cl. ........................................ B23p 11/02
[58] Field of Search .......... 29/447, 157, DIG. 35; 82/4.3; 285/381, 354, 341, 342

[56] References Cited

UNITED STATES PATENTS

| 878,655 | 2/1908 | Miller | 285/341 |
|---|---|---|---|
| 1,004,270 | 9/1911 | Jahnke | 285/381 |
| 1,179,853 | 4/1916 | McCulloch | 29/447 UX |
| 1,186,812 | 6/1916 | McFerran | 285/341 |
| 1,896,371 | 2/1933 | Quarnstrom | 285/341 |
| 1,983,922 | 12/1934 | Ruppel | 82/4.3 |
| 2,455,667 | 12/1948 | Franck | 285/341 X |
| 2,862,732 | 12/1958 | Guillou | 285/342 |

Primary Examiner—Charlie T. Moon
Attorney—Young and Thompson

[57] ABSTRACT

A method of forming a pipe joint, which pipe joint is of the kind in which an external peripheral flange is provided on the pipe and a nut or other retaining device encircles the pipe so as to abut the flange (or a member in engagement therewith), which nut or retaining device can be engaged with a threaded or other suitably shaped part of the fitting to which the pipe is to be joined in such manner that the flange is trapped between the nut or retaining device and part of the fitting. The method comprises forming the flange as an annular element which is expanded by heating and is then shrunk on to the pipe. The inner periphery of the annular element and the outer periphery of the pipe are formed with inter-engaging projections and recesses.

2 Claims, 2 Drawing Figures

PATENTED JUN 13 1972

3,668,754

INVENTOR

DEREK WALTER BOAST

BY Young + Thompson
ATTYS.

METHODS OF FORMING PIPE JOINTS

The invention relates to a method of forming pipe joints. By pipe joints is meant a joint for joining the end of a length of pipe to a fitting, for example, to a coupling element by means of which the pipe can be coupled to a further length of pipe. The invention is particularly, but not exclusively, applicable to methods of forming pipe joints for pipes formed from plastics such as polythene, polypropylene, PVC, ABS, and NYLON (Registered Trade Mark).

The invention relates to a method of forming pipe joints, the joints being of the kind in which an external peripheral flange is provided on the pipe and a nut or other retaining device encircles the pipe so as to abut the flange (or a member in engagement therewith), which nut or retaining device can be engaged with a threaded or other suitably shaped part of the fitting to which the pipe is to be joined in such manner that the flange is trapped between the nut or retaining device and part of the fitting.

According to the invention there is provided a method of forming a pipe joint of the kind referred to wherein an annular element is expanded by heating and is then shrunk on to the pipe to provide said flange.

Preferably the inner periphery of the annular element and/or the outer periphery of the part of the pipe to which the element is to be applied is treated to provide a key for the element when it is shrunk on to the pipe. For example, one or more recesses may be formed in the outer periphery of part of the pipe, which recesses are adapted to receive one or more projections formed on the inner periphery of the annular element. The or each recess may be in the form of a circumferential groove. Each said groove may conveniently be formed by rotating about the longitudinal axis of the pipe a cutter engaging the outer surface of the pipe. A plurality of grooves may be formed simultaneously by employing two or more cutters spaced axially apart along the pipe.

Figure 2:
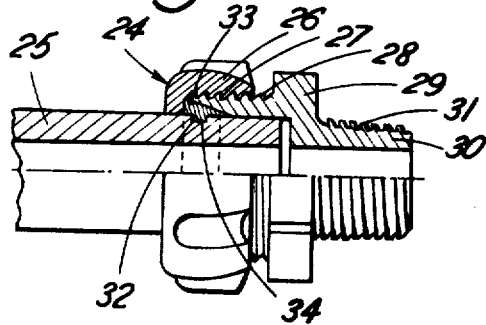

The following is a more detailed description of various embodiments of the invention reference being made to the accompanying drawings in which:

FIG. 1 is a part section, part side elevation of a joint for joining together two lengths of piping; and FIG. 2 is a similar view to FIG. 1 of an alternative form of joint.

In the arrangement described all parts are formed from plastics material.

The joint shown in FIG. 1 comprises a known form of tubular fitting 10 having a stepped bore comprising a central part 11 and, towards each end of the fitting, parts 12 and 13 of increasing diameter. The outer periphery of the fitting at each end thereof is formed with a screw thread 14. Each end of the fitting is adapted to receive an end of one of the two pipes to be coupled, but the joining of only one of the pipes to one end of the fitting will be described.

A nut 15 encircles the pipe 16 and has a peripheral skirt 17 formed with an internal thread 18 engageable with the thread 14. The nut 15 is provided at its inner periphery with an axially extending flange 19 the internal diameter of which is of such a size as to be a sliding fit on the pipe 16.

To connect the pipe 16 to the fitting 10 there is first formed near the end of the pipe a number of axially spaced circumferential grooves 20. Each groove is generally triangular in cross-section and has a radially extending face on the side of the groove nearer the end of the pipe and the other face of the groove is inclined at 45° (or any other appropriate angle) to the first face of the groove. The grooves may conveniently be formed by applying to the end of the pipe 16 a tool comprising a number of shaped axially spaced cutters which can be rotated about the longitudinal axis of the pipe to cut the grooves.

An annular element 21 is provided which is formed at its inner periphery with a number of circumferential ridges 22 which are of a triangular cross-section corresponding in shape to the cross-section of the grooves 20. The internal diameter of the element 21 is fractionally less than the outside of the pipe 16 and the outside diameter of the element 21 is not greater than the internal diameter of the part 13 of the bore in the fitting 10.

The annular element 21 is heated to expand it and is slid over the end of the pipe 16 so that as it cools and contracts the ridges 22 engage in the grooves 20 so that the element becomes firmly locked on the end of the pipe. Where the element 21 is formed from plastics material it may, in some cases, conveniently be heated by immersing it in boiling water for a short time.

The end of the pipe 16 carrying the element 21 is then inserted into the fitting 10 as shown in the drawing and the nut 15 is screwed on to the threaded end 14 of the fitting. The flange 19 on the nut 15 urges the element 21 firmly into engagement with the step 23 between the parts 12 and 13 of the bore in the fitting so as to locate the pipe 16 securely in the fitting. The process is then repeated with the end of another pipe, which is inserted in the opposite end of the fitting in similar manner, so that the two pipes are coupled together by the fitting.

It will be appreciated that by shaping the grooves 20 and ridges 22 as shown the element 21 is firmly locked on to the pipe 19 in a manner to oppose a force tending to withdraw the pipe 19 from the fitting. In the case where the element is formed from plastics the shaping of the ridges in this manner on the element 21 may also facilitate withdrawal of the element from a mould in which it is formed. It will be appreciated however that the grooves and ridges may be of any convenient cross-sectional shape, for example they may be rectangular in shape, and any convenient number of ridges and grooves may be provided.

It will be seen that the pressure of fluid passing through the joint will tend to force the element 21 outwardly against the bore 13 so as to improve the sealing of the joint. However there may be provided a sealing device between the element 21 and the bore 13 in the fitting. For example a resilient O-ring may be received in a peripheral groove in the element 21. The inner surfaces of the walls of the groove may be slightly convex, as viewed in cross-section, so that axial pressure on the walls tends to expand the O-ring outwardly into engagement with the bore 13 thus improving the seal.

In some cases it may be necessary to make provision for expansion and contraction of the piping and in this case the element 21 may be so disposed on the end of the pipe 16 that a gap is left between the end of the pipe and the step between the parts 11 and 12 on the bore. Similarly in some cases, to allow for contraction of the pipe, the flange 19 on the nut need not engage the element 21 but can be spaced from it.

FIG. 2 shows an alternative form of joint for joining together two lengths of piping. In this arrangement a nut 24 encircles one of the pipes 25 and has a peripheral skirt 26 formed with an internal thread 27 engageable with a thread 28 on a further coupling part 29.

The further coupling part 29 is formed with a tapered portion 30 having a central bore in register with the bore in the pipe 25. The tapered portion 30 is formed with an external thread 31 by means of which the tapered portion 30 may be screwed into fluid tight engagement in the end of the pipe (not shown) which is to be coupled to the pipe 25.

There is formed near the end of the pipe 25 a rectangular cross-section circumferential groove 32. An annular element 33 which is generally triangular in cross-section is formed at its inner periphery with a circumferential ridge 34 which is generally triangular in cross-section and has a radial face abutting the radial face of the groove 32 near the end of the pipe 25. The inclined face of the annular element 33 engages a similarly shaped face on the end of the coupling part 29. The arrangement is such that when the nut 26 is screwed up the two inclined faces on the parts 29 and 33 are drawn into wedging engagement to provide a fluid tight seal.

As in the arrangement of FIG. 1 the annular element 33 may be secured to the end of the pipe 25 by heating it to expand it and then sliding it over the end of the pipe 25 so that as it cools and contracts the ridge 34 engages within the groove 32.

Although the above arrangements show joints for coupling together the ends of two lengths of piping it will be appreciated that the principle of the invention can be embodied in a joint between a pipe and any form of fitting. For example the invention is applicable to joints between pipes and fittings such as elbows, tees etc.

If the whole joint is subjected to heat once it has been assembled then the pipes and associated element will expand at the same rate if they are formed from the same material and thus the element will not become loosened on the pipe. Even if the pipe and element are formed from different materials a differential rate of expansion will normally be insignificant.

Although the particular joints hereinbefore described, by way of example, incorporate a nut encircling the pipe and engaging a threaded part of the fitting, it will be appreciated that, as mentioned earlier, the invention is equally applicable to joints in which some other form of retaining device is provided on the pipe and is adapted to engage a suitably shaped part on the fitting to which the pipe is to be connected. For example, in the arrangement of FIG. 1, the pipe may be encircled by an annular cap engaging the element 21 and having a peripheral skirt which is simply snapped over a flange or ridge on the main body of the fitting.

As mentioned earlier plastics materials which are particularly suitable for the joints described are polythene, polypropylene, PVC, ABS, and NYLON (Registered Trade Mark).

I claim:

1. A method for forming a leak-proof joint at one end of a plastics pipe, comprising the steps of:
   a. trimming the end of the pipe to a plane surface perpendicular to the axis thereof;
   b. cutting an endless, circumferentially extending groove in the external surface of the pipe at a predetermined distance from the end of the pipe;
   c. placing on the pipe an internally screw threaded nut, the diameter of the screw thread being substantially larger than the external diameter of the pipe and the nut including, at the end remote from the end of the pipe, a collar which is a close fit around the pipe;
   d. heating a plastics flange element, which element is ring-shaped and has an inner surface of substantially the same diameter as the outside of the pipe and has a ridge formed on said surface and shaped to engage in said groove in the pipe and a plane end face; the flange element being of a smaller outside diameter than the diameter of the screw thread of the nut;
   e. when the flange element has expanded sufficiently for said ridge to fit over the pipe, placing the flange element on the pipe at the location of the groove with the plane end face adjacent said collar, and shrink-fitting the flange element onto the pipe so that the ridge sealingly engages within the groove without deforming the flange element;
   f. introducing the end of the pipe into a pipe fitting having an internally tapered, externally screw threaded, cylindrical portion, the said portion being adapted to engage against the face of the flange element remote from said collar and the screw thread being engageable with the nut;
   g. engaging the nut with the screw threaded portion of the fitting and tightening the nut, whereby the collar of the nut engages and seals against the plane face of the flange element and the fitting engages and seals against the other face of the flange element without deforming the pipe.

2. A method as claimed in claim 1, in which said heating is effected by immersing said flange element in boiling water.

* * * * *